US008755324B2

(12) United States Patent
Yu et al.

(10) Patent No.: US 8,755,324 B2
(45) Date of Patent: Jun. 17, 2014

(54) ALLOCATING BACKHAUL RESOURCES

(75) Inventors: Yi Yu, Irving, TX (US); Yi Song, Plano, TX (US); Zhijun Cai, Euless, TX (US); Chandra sekhar Bontu, Nepean (CA); Rose Qingyang Hu, Allen, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 62 days.

(21) Appl. No.: 13/486,541

(22) Filed: Jun. 1, 2012

(65) Prior Publication Data

US 2013/0034043 A1    Feb. 7, 2013

Related U.S. Application Data

(60) Provisional application No. 61/514,721, filed on Aug. 3, 2011.

(51) Int. Cl.
*H04B 7/14* (2006.01)
*H04W 4/00* (2009.01)
*H04W 72/00* (2009.01)

(52) U.S. Cl.
USPC .............................. 370/315; 370/329; 455/450

(58) Field of Classification Search
None
See application file for complete search history.

(56) References Cited

U.S. PATENT DOCUMENTS

| | | | |
|---|---|---|---|
| 2008/0188231 A1 | 8/2008 | Zhu et al. | |
| 2009/0034458 A1* | 2/2009 | Horn et al. | 370/329 |
| 2009/0163220 A1 | 6/2009 | Liu et al. | |
| 2010/0238826 A1* | 9/2010 | Borran et al. | 370/252 |
| 2011/0235514 A1* | 9/2011 | Huang et al. | 370/235 |
| 2011/0235569 A1* | 9/2011 | Huang et al. | 370/315 |
| 2011/0274031 A1* | 11/2011 | Gaal et al. | 370/315 |
| 2012/0002598 A1* | 1/2012 | Seo et al. | 370/315 |
| 2012/0051256 A1* | 3/2012 | Yuda et al. | 370/252 |
| 2012/0213148 A1* | 8/2012 | Saito et al. | 370/315 |
| 2012/0300738 A1* | 11/2012 | Palanki et al. | 370/329 |
| 2013/0012217 A1* | 1/2013 | Suda | 455/450 |
| 2013/0021962 A1* | 1/2013 | Hu et al. | 370/315 |
| 2013/0028230 A1* | 1/2013 | Borran et al. | 370/329 |
| 2013/0044627 A1* | 2/2013 | Jen | 370/252 |
| 2013/0172000 A1* | 7/2013 | Van Phan et al. | 455/450 |
| 2013/0225188 A1* | 8/2013 | Seo et al. | 455/450 |
| 2013/0242855 A1* | 9/2013 | Kim et al. | 370/315 |
| 2013/0279463 A1* | 10/2013 | Park et al. | 370/329 |

FOREIGN PATENT DOCUMENTS

WO    2011/085519    7/2011

OTHER PUBLICATIONS

International Search Report and Written Opinion of the Intenantional Searching Authority issued in International Application No. PCT/US2012/049609 on Nov. 13, 2012; 11 pages.
International Preliminary Report on Patentability under Chapter I issued in International Application No. PCT/US2012/049609 on Feb. 13, 2014; 7 pages.

* cited by examiner

*Primary Examiner* — Clemence Han
(74) *Attorney, Agent, or Firm* — Fish & Richardson P.C.

(57) ABSTRACT

Systems, apparatuses, and methods may be directed to operating wireless communication resources for a wireless communications system that includes a relay node and a base station. A backhaul link data rate may be identified for a first wireless link between the relay node and the base station. An access link data rate may be identified for a second wireless link between the relay node and a user equipment (UE). The allocation of available resources between the backhaul link and the access link may be adjusted or changed to optimize the allocation of resources.

17 Claims, 11 Drawing Sheets

ALLOCATING BACKHAUL RESOURCES

CLAIM OF PRIORITY

The present application claims priority under 35 U.S.C. §119(e) to U.S. Provisional Patent Application having Ser. No. 61/514,721 filed on Aug. 3, 2011, the entire contents of which are incorporated herein by reference.

FIELD

The present disclosure pertains to wireless communication systems, and more particularly to allocation of backhaul resources.

BACKGROUND

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long-Term Evolution (LTE) and LTE-Advanced (LTE-A). For example, an LTE or LTE-A system might be an Evolved Universal Terrestrial Radio Access Network (E-UTRAN) and include an evolved Node B (or eNB), a wireless access point, or a similar component rather than a traditional base station. As used herein, the term "access node" refers to any component of the wireless network, such as a traditional base station, a wireless access point, or an LTE or LTE-A node B or eNB, that creates a geographical area of reception and transmission coverage allowing a UE or a relay node to access other components in a telecommunications system. In this document, the term "access node" and "access device" may be used interchangeably, but it is understood that an access node may comprise a plurality of hardware and software. A relay node (RN) is a device that facilitates communication with an eNB. RNs, generally, can be divided into three groups: layer 1 RNs, layer 2 RNs, and layer 3 RNs. Relay technology may enhance the user throughput and network coverage.

BRIEF DESCRIPTION OF THE DRAWINGS

FIG. 7 is a block diagram of an example asynchronous multicast broadcast single frequency network (MBSFN) resource allocation for multiple relay nodes.

DETAILED DESCRIPTION

Figure 1:
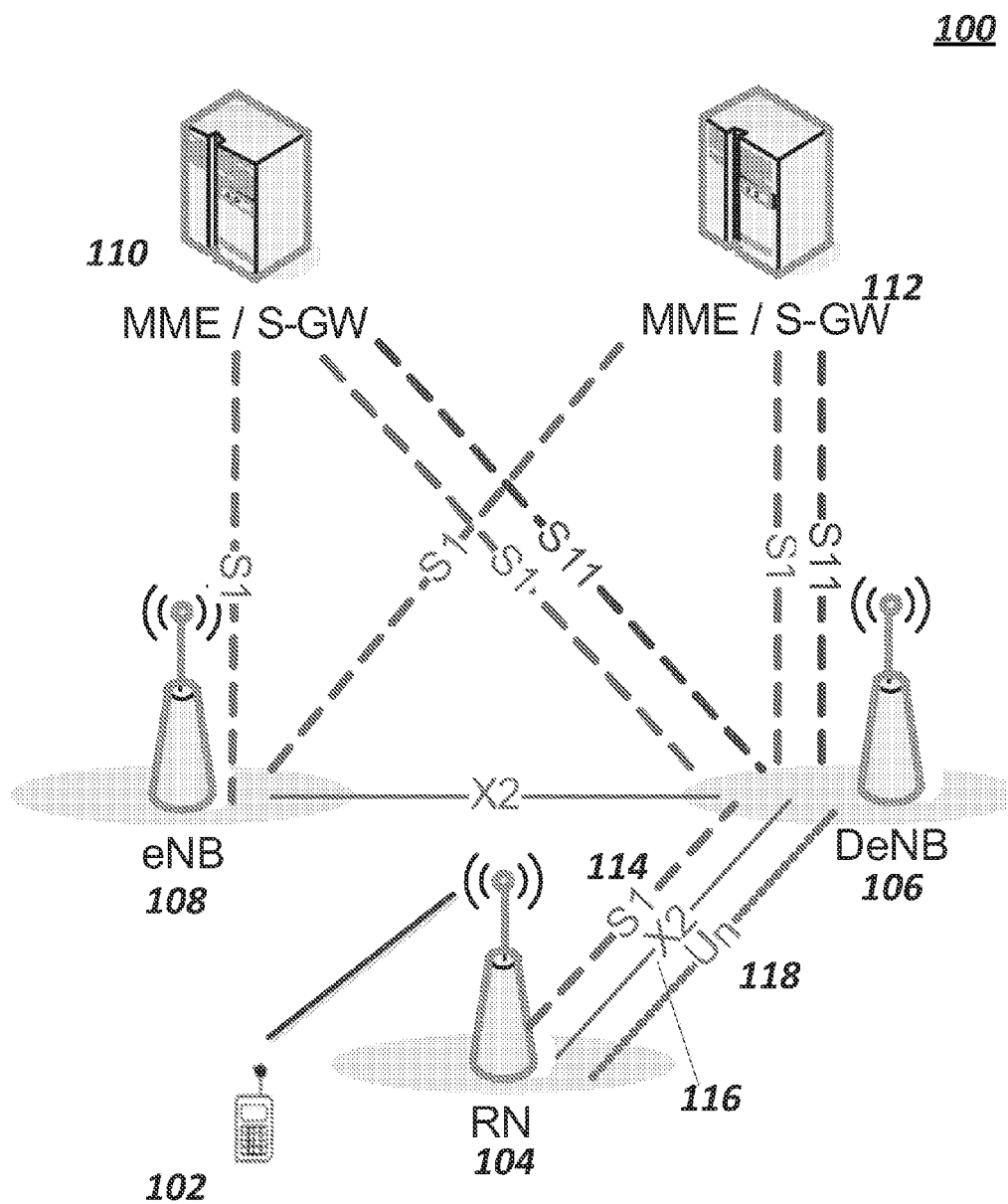
FIG. 1 is a schematic diagram of an example wireless communication system that includes a donor eNB and a relay node.

Aspects of the present disclosure are directed to backhaul resource allocation for communication between an eNB and a relay node (RN). For static subframe allocation, the RN can signal the number of connected users in the RN cell to a donor eNB (DeNB). E-UTRAN supports relaying by having a relay node (RN) wirelessly connected to an eNB, which is referred to as Donor eNB (DeNB), that serves the RN to communicate with evolved packet core (EPC) network. All RNs in the same donor cell may have the same backhaul subframe configuration.

For dynamic resource allocation, the RN can signal the transmission data rate on each of its access link to the DeNB for optimal resource allocation. The transmission data rate could be average data rate over a short time window.

For semi-static allocation, the RN can signal/update the average signal to interference plus noise ratio SINR of each UE attached to the RN (or RN cell UE) to the DeNB. The geometry or the average SINR of each RN cell UE may be reported to the DeNB at the call setup and shall be updated semi-statically depending on the UE mobility and the radio link changes. Multiple RNs may form an RN group and share the same subframe resource and identified by an RN group ID. Different RN groups can use different subframe resources to avoid interference.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used herein, the terms "device," "user equipment," and "UE" might in some cases refer to mobile devices such as mobile telephones, personal digital assistants, handheld or laptop computers, BLACKBERRY® devices, and similar devices that have telecommunications capabilities. Such a UE might consist of a UE and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user agent," "UA," "user equipment," "UE,"

"user device" and "user node" might be used synonymously herein. Other abbreviations and terms are provided below:

CQI Channel Quality Indicator
DL Down Link
E-UTRAN Evolved Universal Terrestrial Radio Access Network
eNB E-UTRAN Node B
DeNB Donor eNB
HARQ Hybrid ARQ (Automatic Repeat Request)
LTE Long Term Evolution
LTE-A LTE-Advanced
MBSFN Multicast Broadcast Single Frequency Network
MCS Modulation and Coding Scheme
MME Mobility Management Entity
PRB Physical Resource Block
QoS Quality of Service
RN Relay Node
RRC Radio Resource Control
SGW Serving Gateway
TTI Transmission Time Interval
UE User Equipment
UL Uplink A Type I relay node (RN) is an in-band/out-of-band relaying node that may be characterized by the following:

It controls cells, each of which appears to the UE as a separate cell distinct from the donor cell.

The cells shall have their own Physical Cell ID, synchronization channels, reference symbols, etc.

In the context of single-cell operation, the UE shall receive scheduling information and HARQ feedback directly from the relay node and send its control channels (SR/CQI/ACK) to the relay node.

A feature for the type I relay is the wireless in-band backhaul. A layer 1 RN may be a repeater that merely retransmits a received signal without any modification other than amplification and possibly slight delay. A layer 2 RN can demodulate/decode a transmission that it receives, re-encode/modulate the result of the decoding, and then transmit the modulated data. A layer 3 RN may have full radio resource control capabilities and can thus function similarly to an access node. The radio resource control protocols used by an RN may be the same as those used by an access node, and the RN may have a unique cell identity typically used by an access node. A "layer x" RN is distinguished from a "Type x" RN. For example, a layer 1 RN is not a Type 1 RN; in fact, a Type 1 RN is functionally similar to a layer 3 RN. Type 1 RNs are described in greater detail below.

For the purpose of this disclosure, a RN is distinguished from an eNB or other access node because the term RN connotes the presence of at least one eNB or other access node (and the cell associated with that access node) and possibly other RNs to access other components in a telecommunications system, such as a MME/SGW. Additionally, for the purposes of this disclosure, the term "eNB" is not limited to only an "evolved node-B," but also may refer to any type of access node suitable for communicating with an MME/SGW or a component of an enhanced packet core.

Certain aspects of the present disclosure are directed to a method for operating a wireless communications system that includes a relay node and a base station. The method can include identifying, by the base station, a backhaul link data rate for a first wireless link between the relay node and the base station. An access link data rate can be identified for a second wireless link between the relay node and a user equipment (UE). The allocation of available resources can be adjusted and optimized between the backhaul link and the access link.

Certain aspects of the present disclosure are directed to a network element operating in a wireless communications network. The network element can include a hardware processor and a transceiver. The hardware processor and transceiver configured to identify a backhaul link data rate for a first wireless link between the relay node and the base station. An access link data rate can be identified for a second wireless link between the relay node and a user equipment (UE). The allocation of available resources between the backhaul link and the access link can be adjusted and optimized.

In certain implementations of the embodiments, the backhaul data rate between the base station and a specific relay node may be identified based, at least in part, by a measured average signal to interference plus noise ratio (SINR) over the specific link.

In certain implementations of the embodiments, the access link data rate may be identified based, at least in part, on an average signal to interference plus noise ratio (SINR) observed over the access link.

In certain implementations of the embodiments, the average SINR observed over the access link may be scaled by a power control parameter.

In certain implementations of the embodiments, the access link data rate may be identified based, at least in part, on an average signal to interference plus noise ratio (SINR) observed over the access link between the relay node and the associated User equipment.

In certain implementations of the embodiments, the average SINR observed over the access link between the relay node and the UE may be scaled by a power control parameter.

In certain implementations of the embodiments, an allocation of resources between the backhaul link and access link is optimized by assigning n subframes every $T_{bh}$ subframes such that the aggregate data transmitted in n subframes over the backhaul link and the aggregate data transmitted in ($T_{bh}$−n) subframes over N independent access links are equal.

In certain implementations of the embodiments, an allocation of resources between the backhaul link and access link may be optimized by assigning $n_{ij}$, resource blocks to carry the data for UE-j over the backhaul link between the base station and RN-i such that the expected future transport block for UE-j can be transmitted using $n_{ij}$, resource blocks.

In certain implementations of the embodiments, the expected future transport block size may be minimum of the transport block size expected to be transmitted by the RN-i and the size of the data buffer for UE-j, where UE-j is attached to RN-i.

In certain implementations of the embodiments, an allocation of resources between the backhaul link and access link may be optimized by assigning $n_i$ subframes every $T_{bh}$ subframes to the backhaul link between the base station and RN-i such that the aggregate data transmitted in $n_i$ subframes over the backhaul link and the aggregate data transmitted in ($T_{bh}$−$n_i$) subframes over access link associated with RN-i are equal.

In certain implementations of the embodiments, optimizing the data rate over a backhaul link associated with a relay node and the access link data rate may include balancing the backhaul data rate and the access link data rate based, at least in part, on a number of UEs connected to the said relay node.

Certain implementations may include receiving the average SINR of the UE access link from the relay node.

Certain implementations may include predicting a demand for resources for the UE.

Certain implementations may include identifying a signal to interference plus noise ratio between the relay node and the base station, and wherein identifying the backhaul data rate is based, at least in part, on the signal to interference and noise ratio.

In certain implementations of the embodiments, the access link data rate may be identified based, at least in part, on the average SINR of every UE connected to the relay node. In certain implementations of the embodiments, the backhaul data rate between the base station and a specific relay node is identified based, at least in part, by a measured average signal to interference plus noise ratio (SINR) over the specific link.

In certain implementations of the embodiments, the access link data rate is identified based, at least in part, on an average signal to interference plus noise ratio (SINR) observed over the access link.

In certain implementations of the embodiments, the average SINR observed over the access link is scaled by a power control parameter.

In certain implementations of the embodiments, the access link data rate is identified based, at least in part, on an average signal to interference plus noise ratio (SINR) observed over the access link between the relay node and the associated User equipment.

In certain implementations of the embodiments, the average SINR observed over the access link between the relay node and the UE is scaled by a power control parameter.

In certain implementations of the embodiments, an allocation of resources between the backhaul link and access link is optimized by assigning n subframes every $T_{bh}$ subframes such that the aggregate data transmitted in n subframes over the backhaul link and the aggregate data transmitted in ($T_{bh}$ − n) subframes over N independent access links are equal.

In certain implementations of the embodiments, an allocation of resources between the backhaul link and access link is optimized by assigning $n_{ij}$ resource blocks to carry the data for UE-j over the backhaul link between the base station and RN-i such that the expected future transport block for UE-j can be transmitted using $n_{ij}$ resource blocks.

In certain implementations of the embodiments, the expected future transport block size is minimum of the transport block size expected to be transmitted by the RN-i and the size of the data buffer for UE-j, where UE-j is attached to RN-i.

In certain implementations of the embodiments, an allocation of resources between the backhaul link and access link is optimized by assigning $n_i$ subframes every $T_{bh}$ subframes to the backhaul link between the base station and RN-i such that the aggregate data transmitted in $n_i$ subframes over the backhaul link and the aggregate data transmitted in ($T_{bh}$−$n_i$) subframes over access link associated with RN-i are equal.

In certain implementations of the embodiments, optimizing the backhaul data rate and the access link data rate comprises balancing the backhaul data rate and the access link data rate based, at least in part, on a number of UEs connected to the relay node.

Certain implementations of the embodiments may include receiving information about the UE from the relay node.

Certain implementations of the embodiments may include predicting a demand for resources for the UE.

Certain implementations of the embodiments may include identifying a signal to interference and noise ratio between the relay node and the base station, and wherein identifying the backhaul data rate is based, at least in part, on the signal to interference and noise ratio.

In certain implementations of the embodiments, the backhaul data rate is identified based, at least in part, on the average signal to interference plus noise ratio of every UE connected to the relay node.

In certain implementations of the embodiments, the backhaul data rate is identified based, at least in part, on the aggregated access link data rate of the relay node.

FIG. 1 is a diagram of an example wireless communication system 100 that includes a relay node, according to an embodiment of the disclosure. Wireless communication system 100 may represent an architecture of a LTE or LTE-A system, such as a UE in communication with an EUTRAN. In an example of operation of an RN, UE 102 communicates with MME/SGW 112 via RN 104 and Donor eNB (DeNB) 106. UE 102 may also communicate with RN 104, which may communicate with eNB 108, which in turn communicates with MME/SGW 110 via an interface, such as the S1 interface 114 identified by the phantom line.

E-UTRAN supports relaying by having a RN 104 wirelessly connected to an eNB that serves the RN 104, called Donor eNB (DeNB) 106, via a modified version of the E-UTRA radio interface, the modified version referred to as the "Un" interface 118. The RN 104 supports the DeNB functionality meaning it terminates the radio protocols of the E-UTRA radio interface, and the S1 114 and X2 116 interfaces. Functionality defined for eNBs also applies to RNs unless explicitly specified. In addition to the eNB functionality, the RN 104 may also support a subset of the UE functionality, e.g. physical layer, layer-2, RRC, and NAS functionality, in order to wirelessly connect to the DeNB 106. In general, an eNB may host the following functions:

Functions for Radio Resource Management: Radio Bearer Control, Radio Admission Control, Connection Mobility Control, Dynamic allocation of resources to UEs in both uplink and downlink (scheduling);

IP header compression and encryption of user data stream;

Selection of an MME at UE attachment when no routing to an MME can be determined from the information provided by the UE;

Routing of User Plane data towards Serving Gateway;

Scheduling and transmission of paging messages (originated from the MME);

Scheduling and transmission of broadcast information (originated from the MME or O&M);

Measurement and measurement reporting configuration for mobility and scheduling;

Scheduling and transmission of PWS (which includes ETWS and CMAS) messages (originated from the MME);

CSG handling;

Transport level packet marking in the uplink.

The DeNB may host the following functions in addition to the eNB functions:

S1/X2 proxy functionality for supporting RNs;

S11 termination and S-GW/P-GW functionality for supporting RNs.

The architecture for supporting RNs is shown in FIG. 1. The RN terminates the S1 114, X2 116, and Un 118 interfaces. The DeNB 106 provides S1 and X2 proxy functionality between the RN 104 and other network nodes (other eNBs, MMEs and S-GWs). The S1 and X2 proxy functionality includes passing UE-dedicated S1 and X2 signalling messages as well as GTP data packets between the S1 and X2 interfaces associated with the RN and the S1 and X2 interfaces associated with other network nodes. Due to the proxy functionality, the DeNB 106 appears as a MME (for S1-MME), an eNB (for X2) and an S-GW (for S1-U) to the RN.

The above examples describe eNBs servicing one RN; however, each eNB may communicate with more RNs. Other arrangements of the identified components are possible, and more, fewer, different, or additional components may be present.

Relay technology is used to improve average cell throughput and enhance cell coverage. Further, the inclusion of RNs in the LTE-A system is also intended for the purposes of efficiently extending the UE's battery life, of increasing UE throughput, and of extending cell coverage. One of the issues presented by the inclusion of RNs is that calculating the overall signal quality between the UE and the MME/SGW is complicated by the presence of more than one communication link. For example, while the connection between the MME and the eNB is often a wired link of good quality, the signal qualities of both the link between the UE and the RN and the link between the RN and the eNB may be considered when determining which access node or RN a UE should attempt to connect to or camp on to during a mobility procedure. Mobility procedures include cell selection, cell reselection, handover, or more generally, any mobility procedure that UE may perform. In the embodiments described herein, the link between the UE and the RN may be referred to as the access link and the link between the RN and the eNB may be referred to as a backhaul link. However, other names may be used. Additionally, for more complex communications systems, multiple backhaul links may exist if additional RNs are between the UE-accessed RN and the eNB. Still further, multiple access links could potentially exist as well. Other arrangements are also possible, all of which are within the spirit and scope of the present disclosure.

The RN can operate in half-duplex mode to avoid in-band interference and to reduce RN cost. In a traditional cellular network, the backhaul link from the eNB to the MME/SGW is typically over a wired or fiber connection. The wireless in-band backhaul feature for the type I relays enables fast roll-out of the RNs in a network with lower cost. On the other hand, the available radio resources have to be divided between the backhaul link and the access link (i.e. the radio link between a UE and an RN). Part of the radio resources have to be taken from the access link for the backhaul link transmission.

Figure 2:
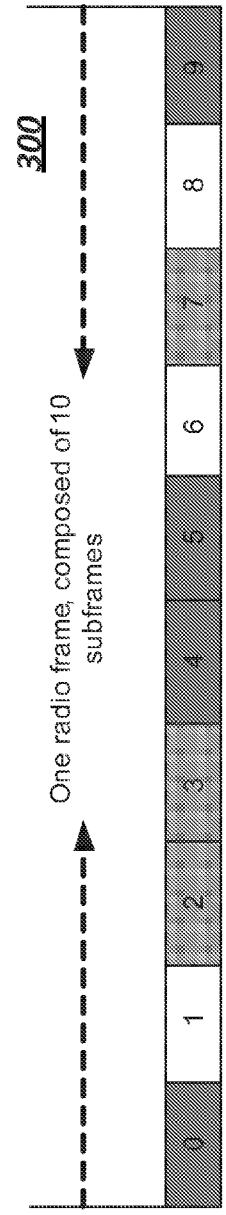
FIG. 2 is a diagram of subframes for half-duplex communication on a backhaul link.

FIG. 2 is a diagram of DL subframe partitioning for access link and backhaul link. FIG. 2 shows a typical half-duplex communication between the Donor eNB (DeNB) and the RN. As a result, the system capacity for a Type I relay network may be dependent on the backhaul link quality as well as the resource partitioning between the backhaul link and access link. In a Type I relay network with wireless in-band backhaul, the RN operates in half-duplex mode which means that the RN refrains transmission to the UE when it receives DL transmission from the donor eNB. The total available radio resource is partitioned into two parts: backhaul link radio resource and access link radio resource.

Figure 3:
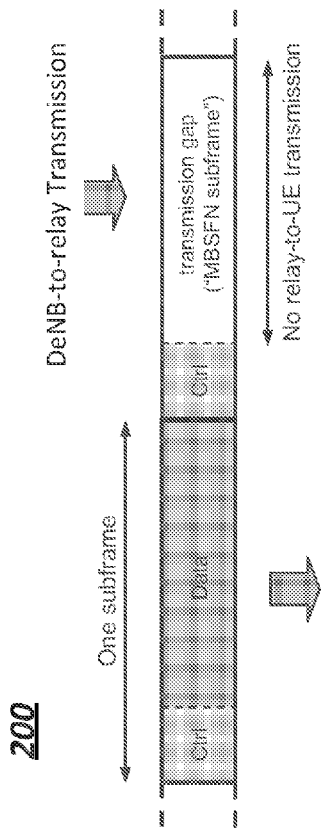
FIG. 3 is a diagram of an example of backhaul subframe allocation.

The DL resource partitioning is typically done in time domain to minimize the self-interference at the RN from both links. For example, some subframes are dedicated for the backhaul transmission and the remaining subframes are used to serve the RN cell UEs. An example is shown in FIG. 3.

Furthermore, in a donor cell with multiple RNs, the donor eNB needs to coordinate the backhaul resource allocation among the RNs as well as serves the donor cell UEs. In a special case wherein all UEs in the donor cell are associated with RNs, the donor eNB could allocate all subframes that can be used for MBSFN for backhaul communication to the RNs. Effective backhaul resource allocation should be able to balance the transmission on backhaul link, access link in the donor cell and access link in the RN cells such that higher spectral efficiency and user throughput can be achieved for the network.

As the donor eNB determines the backhaul radio resource allocation, some knowledge of the RN cells has to be available at the Donor eNB in order for the donor eNB to effectively allocate the resource for the RNs, e.g. number of RNs in the donor cell, number of UEs in the RN cell, etc. The backhaul resource allocation could be static, semi-static or dynamic, depending on how fast the RN cells send updated information to the donor eNB. However, it is important to reduce the feedback from the RN to the donor eNB and thus reduce the signalling overhead over the backhaul. Several solutions are proposed in the next section in terms of trade-off between performance and feedback overhead.

For the uplink transmission, the RN cells UEs initiate the transmission to the RN on the access link. The RN can report the aggregated uplink traffic buffer size from all RN cell UEs to the donor eNB using the buffer status report message (which is implemented in the LTE Rel-8 system). It should be noted that the actual allocated amount of resource for the uplink backhaul is also dependent on the spectral efficiency over that link as well as the QoS of the corresponding traffic. The DeNB will treat the RNs as UEs and allocate the uplink backhaul resource accordingly based on the buffer status report message from the RNs, uplink backhaul spectral efficiency and QoS requirement. Thus no special handling would be necessary for the DeNB to allocate uplink resources among the RNs in this case and it is naturally an on-demand procedure. In addition in LTE Rel-10 the uplink backhaul resource is automatically allocated according to the downlink backhaul resource. For example, in a FDD system, for every configured downlink backhaul subframe, a corresponding uplink backhaul subframe 4 milliseconds later is configured. Therefore we mainly focus on the downlink backhaul resource allocation for a type I relay network in this paper due to the more complicated nature of the problem.

MBSFN subframes may be adopted at the RN for receiving downlink backhaul transmission from the DeNB. During those MBSFN subframes, the RN does not transmit to the RN cell UEs. The MBSFN subframe configuration is determined by the DeNB. Appropriate MBSFN configuration facilitates the balance of the traffic flow on both links (access link and backhaul link). Otherwise, traffic buffer overflow or empty buffer at the RN may occur (e.g., buffer over flow at RN may occur if there is not sufficient resource left for the access link transmission, or buffer is empty if there is not sufficient traffic at the RN to be transmitted to the UE). This will lead to inefficient utilization of the radio resources and thus compromise the system capacity.

The present disclosure pertains to downlink backhaul resource allocation schemes e.g., for the Type I relay network under the consideration of both performance and practicability. Semi-static allocation solutions are able to achieve system throughput gain compared with the static resource allocation scheme, even with limited feedback from the RN. The present disclosure also considers wireless in-band backhaul resource allocation over the backhaul link. In the present disclosure, the relay node can operate like a small base station that will make its independent scheduling decision and no feedback is necessary for the purpose of relay cell scheduling. Possible feedback may be used to achieve traffic load balancing between relay link and access link. In some implementations, such as LTE-A, over the backhaul link, new channels such as the R-PDCCH and R-PDSCH are designed to deliver the backhaul traffic more efficiently.

As mentioned previously, the present disclosure pertains to the backhaul resource allocation. In certain implementations, a static backhaul subframe allocation scheme with minimum feedback from the RNs to the DeNB may be used. In other implementations, a dynamic backhaul resource allocation scheme can be used when the RN reports the transmitted data rate on the RN cell access link. A semi-static resource allocation scheme based on the UE geometry is also discussed, which achieves comparable performance with the dynamic allocation scheme with much reduced overhead.

In the static backhaul subframe allocation, the number of users associated with each RN could be assumed to be known at the DeNB in order to allocate different amount of resources to different RNs. One of the advantages of the static subframe allocation is that the DeNB can operate without knowledge of RN cell user's bandwidth requirements. The subframes allocated to backhaul communication could be synchronous among the multiple RNs in a donor cell which means that each RN in the donor cell is configured with same backhaul subframes. In LTE Rel-10, synchronous subframe allocation would mean the same MBSFN configuration for the RNs and all the RNs listen to the DeNB for the DL transmission at the same subframes.

Figure 4A:
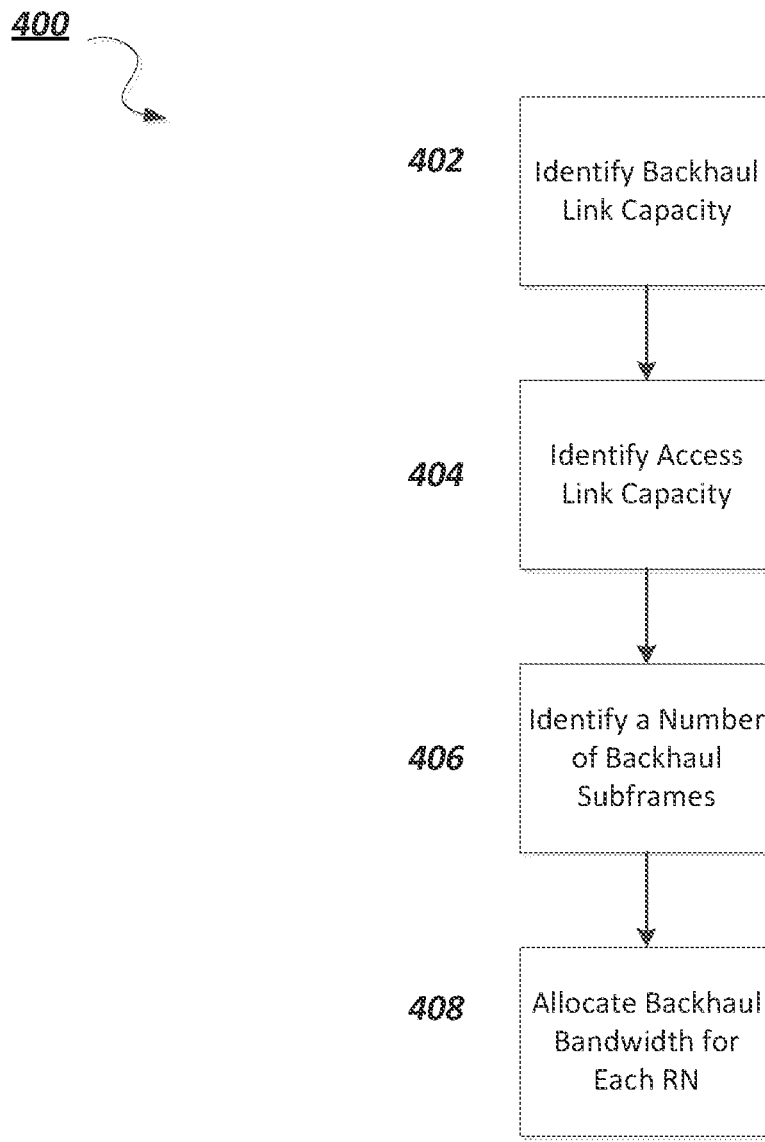
FIG. 4A is a process flow diagram for static allocation of backhaul resources.

FIG. 4A is a process flow diagram 400 for static allocation of backhaul resources. The required capacity on the backhaul link can be estimated (402) at the DeNB. In certain implementations, the capacity on the backhaul link can be estimated based, at least in part, on the average signal to interference plus noise ratio (SINR) from the donor eNB to the RN. The average SINR from the DeNB to the RN i can be denoted as $S_i$. Applying Shannon theorem, the estimated capacity on the backhaul link in terms of bits per second per Hz (bits/sec/Hz) can be derived as following:

$$R_i^b = \log(1+S_i), i=1\ldots,N, \qquad (1)$$

where N is the number of RNs in the donor cell. For a specific cellular system, $R_i^b$ can also be obtained empirically based on the MCS options available. In the above equation, the logarithmic function is with respect to base 2. In general, $R_i^b$ can be represented as a function of the SINR, $S_i$ as $R_i^b = f(S_i)$, where $f(\ldots)$ represented an arbitrary function which is decided by the receiver implementation. In the above equation, $f(x)$ is expressed as $\log_2(1+x)$.

The required capacity of the RN access link can be identified (404). Because the access link quality at the RN cell may not be known to the DeNB, the median SINR $\rho_i$ of the access link geometry distribution in RN cell i can be used to determine the estimated capacity on the access link per second per Hz:

$$R_i^a = \log(1+\alpha_i\cdot\rho_i), i=1,\ldots,N \qquad (2)$$

where $\alpha_i$ accounts for possible different power adjustments applied in the RN cell due to possible power offset of data compared to reference signals ($\rho_i$ is usually obtained from reference signals). For instance, the cell edge user may benefit from a higher transmission power from the RN at its allocated frequency band, whereas the cell center user may still have a good signal reception with the RN transmitting at a relatively lower power at its allocated frequency band. The value $\rho_i$ can be chosen to be the mean SINR over the UEs instead of the median SINR.

Denote $M_i$ as the number of UEs in RN i. As an example, $\rho$ can be set to 15 dB according to our previous simulation results. At each backhaul subframe, the backhaul bandwidth can be allocated so that the bandwidth allocated to each RN is proportional to (or other function of) the number of UEs in that RN cell:

$$B_i^b = \frac{M_i}{\sum_{i=1}^{N} M_i \cdot \omega_i} \cdot B \cdot \omega_i, i=1,\ldots,N \qquad (3)$$

where B is the bandwidth allocated for the backhaul at the DeNB and $\omega_i$ is the weight factor reflecting the different backhaul link quality among the RNs. For example, $\omega_i$ can be set to be inversely proportional to the backhaul link transmission rate, i.e., $\omega_i \propto 1/R_i^b$. The less backhaul bandwidth needs to be allocated if the backhaul link transmission rate is higher. If backhaul link qualities are about the same among RNs communicating with a DeNB, then $\omega_i$ can be set to 1.

The number of backhaul subframes can be identified (406). In the case that no UE exists in the RN cell, no backhaul resources would be allocated to that RN. The reason to allocate more resources to the RN cell with more users is to facilitate fairness among the users and improve cell edge performance. The aggregated amount of data on the backhaul per subframe is (in bits per subframe):

$$R_{bh} = \sum_{i=1}^{N} R_i^b \cdot B_i^b \cdot \tau = \sum_{i=1}^{N}\left(\log(1+S_i)\cdot \frac{M_i}{\sum_{i=1}^{N} M_i \cdot \omega_i} \cdot B \cdot \omega_i \cdot \tau\right) \qquad (4)$$

where $\tau$ represents the time duration per subframe, e.g. 1 ms in LTE. The number of subframes allocated to backhaul, n out of a total available subframes $T_{bh}$ is derived so that the aggregated data rate on backhaul link is the same as the aggregated data rate on the access link over all the RNs:

$$R_{bh} \cdot n = \sum_{i=1}^{N} R_i^a \cdot B_i^a \cdot \tau \cdot (T_{bh} - n) \qquad (5)$$

where $B_i^a$ represents the available access bandwidth at the ith RN cell and $T_{bh}$ is the periodicity of the backhaul subframe allocation in units of subframes. Thus the number of backhaul subframes can be derived as follows:

$$n = \left\lceil \frac{\sum_{i=1}^{N} R_i^a \cdot B_i^a \cdot T_{bh}}{\sum_{i=1}^{N}\left(\log(1+S_i)\cdot \frac{M_i}{\sum_{i=1}^{N} M_i \cdot \omega_i} \cdot B \cdot \omega_i + \sum_{i=1}^{N} R_i^a \cdot B_i^a\right)} \right\rceil \qquad (6)$$

$$= \left\lceil \frac{\sum_{i=1}^{N} \log(1+\alpha_i\rho_i)\cdot B_i^a \cdot T_{bh}}{\sum_{i=1}^{N}\left(\log(1+S_i)\cdot \frac{M_i}{\sum_{i=1}^{N} M_i \cdot \omega_i} \cdot B \cdot \omega_i + \log(1+\alpha_i\rho_i)\cdot B_i^a\right)} \right\rceil$$

Assume $B_i^a$ is the same as the bandwidth at DeNB (full frequency reuse for the RN), i.e. $B_i^a = B$. Furthermore, $\rho_i$ and $\alpha_i$ are assumed to be the same for all the RNs, $\rho_i = \rho$ and $\alpha_i = \alpha$ for all i, if no knowledge about the access link quality at the RNs is available at the DeNB. With these assumptions, the above equation can be simplified as follows:

$$n = \left\lceil \frac{N\log(1+\alpha\rho) \cdot T_{bh}}{\sum_{i=1}^{N}\left(\log(1+S_i) \cdot \frac{M_i}{\sum_{i=1}^{N} M_i \cdot \omega_i} \cdot \omega_i\right) + N\log(1+\alpha\rho)} \right\rceil \quad (7)$$

Where [x] represents the smallest integer greater than or equal to x.

After the number of backhaul subframes is determined, the backhaul resource for each RN can be allocated (408) according to equation (3).

In the above derivation, the UEs associated with the donor eNB directly were not considered. This may not be an issue if the backhaul link quality is better than the access link and not all donor cell resource will be taken for the backhaul transmission. In some cases, the donor eNB may reserve certain amount of resource to guarantee that the UEs connected to the LTE network through the donor eNB have enough resources. Denote the maximum number of backhaul subframes available as $n_{max}$. If the number of backhaul subframe n calculated from equation (7) is smaller than $n_{max}$, no additional processing is necessary. Otherwise, if the number of backhaul subframe n is greater than $n_{max}$, then n is changed to $n_{max}$ instead. To determine the value of $n_{max}$, a simple solution is to make it proportional to the number of UEs in each RN cell:

$$n_{max} = \left\lceil \frac{\sum_{i=1}^{N} M_i \gamma_i}{M_0 \gamma_0 + \sum_{i=1}^{N} M_i \gamma_i} \cdot T_{bh} \right\rceil \quad (8)$$

where $M_0$, represents the number of UEs associated with donor eNB, and $\gamma_i$ is the weight factor applied to account for different user priority.

In summary, the static synchronous subframe allocation uses the knowledge of the number of RN cells and the number of UEs attached to each RN cell. In some relay architecture this information may be already known at the DeNB. For other relay architectures where the number of RN cell users is not available at the DeNB, the RN may report this information to DeNB by high layer signalling. In static subframe allocation scheme, statistics of large scale user SINR distribution of the donor cell and RN cell could be used as a priori knowledge. If this a priori knowledge is not available, the RN could signal the mean or median SINR of the RN cell users to the donor eNB.

Alternatively in the static subframe allocation scheme, without knowing the number of UEs in a RN, the donor eNB could determine the backhaul resource for the RN based on the average SINR of the UEs in the RN cell and the average SINR from the DeNB to the RN. For example, the number of backhaul subframes for RN i can be determined as follows:

$$n_i = \frac{\log(1+\alpha_i \rho_i) \cdot T_{bh}}{\log(1+S_i) + \log(1+\alpha_i \rho_i)}$$

In this case, the RN may not need to send any information to the DeNB if the average SINR of the UEs in the RN, $\rho_i$ is of a priori knowledge. Otherwise the RN could signal the mean or median SINR of the UEs in the RN cell to the DeNB. If the maximum number of subframes can be used for backhaul transmission is $n_{max}$ and $\sum_{i=1}^{N} n_i \leq n_{max}$, then no additional processing is necessary. Otherwise, if $\sum_{i=1}^{N} n_i > n_{max}$, the number of allocated backhaul subframes for RN i can be calculated as follows:

$$\tilde{n}_i = \frac{n_i}{\sum_{i=1}^{N} n_i} \cdot n_{max}, i = 1, \ldots, N,$$

Figure 4B:
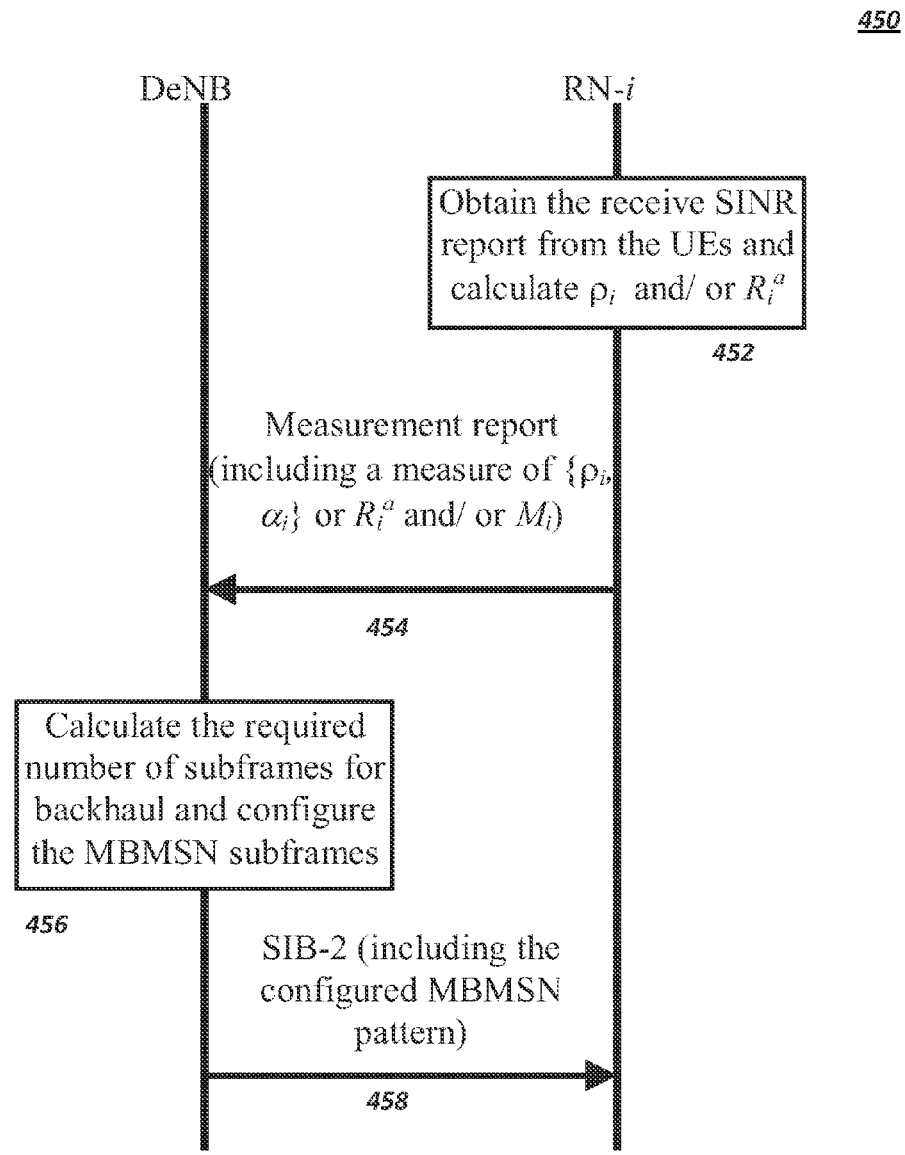
FIG. 4B is a swim-lane diagram for static allocation of backhaul resources.

FIG. 4B is a swim-lane diagram 450 for static allocation of backhaul resources. A relay node RN, (denoting one of i relay nodes) can obtain the SINR report from one or more UEs, and can calculate $\rho_i$ and/or $R_i^a$ (452). A measurement report can be sent to the DeNB (454). The measurement report can include a measure of $\rho_v$, $\alpha_i$ or $R_i^a$ and/or $M_i$. The DeNB can calculate the required number of subframes for backhaul and configure the MBSFN subframes (456). The SIB-2 can be transmitted to the RN, (458). The SIB-2 message can include the configured MBSFN pattern.

Figure 5:
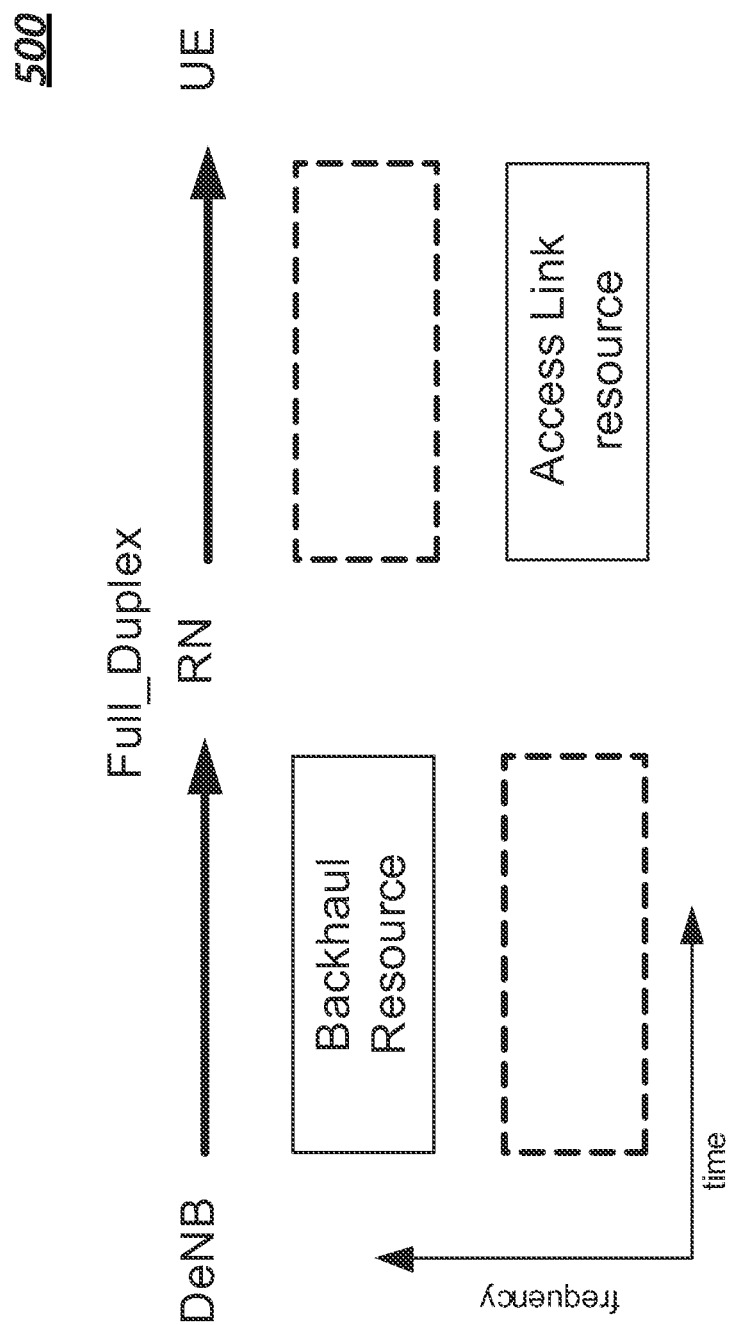
FIG. 5 is a schematic block diagram of an example resource allocation for an access link and a backhaul link.

The DeNB can dynamically allocate the backhaul resources. For the DeNB to dynamically allocate the backhaul resource, the donor eNB would need to track the transmitted data rate on each access link instantaneously and predict the data rate on the access link at a future time instance. The DeNB then could dynamically change the resource assignment for the backhaul according to the requirement on access link data rates. In the dynamic resource allocation scheme, the resource between the access link and the backhaul link may be separated on the frequency domain, as shown in FIG. 5. FIG. 5 is a schematic block diagram 500 of an example resource allocation for an access link and a backhaul link. In FIG. 5, the dotted boxes indicate null resource blocks, where there is no transmission. The RN may operate in full duplex mode with isolation between the backhaul link and access link on the frequency domain.

Figure 6A:
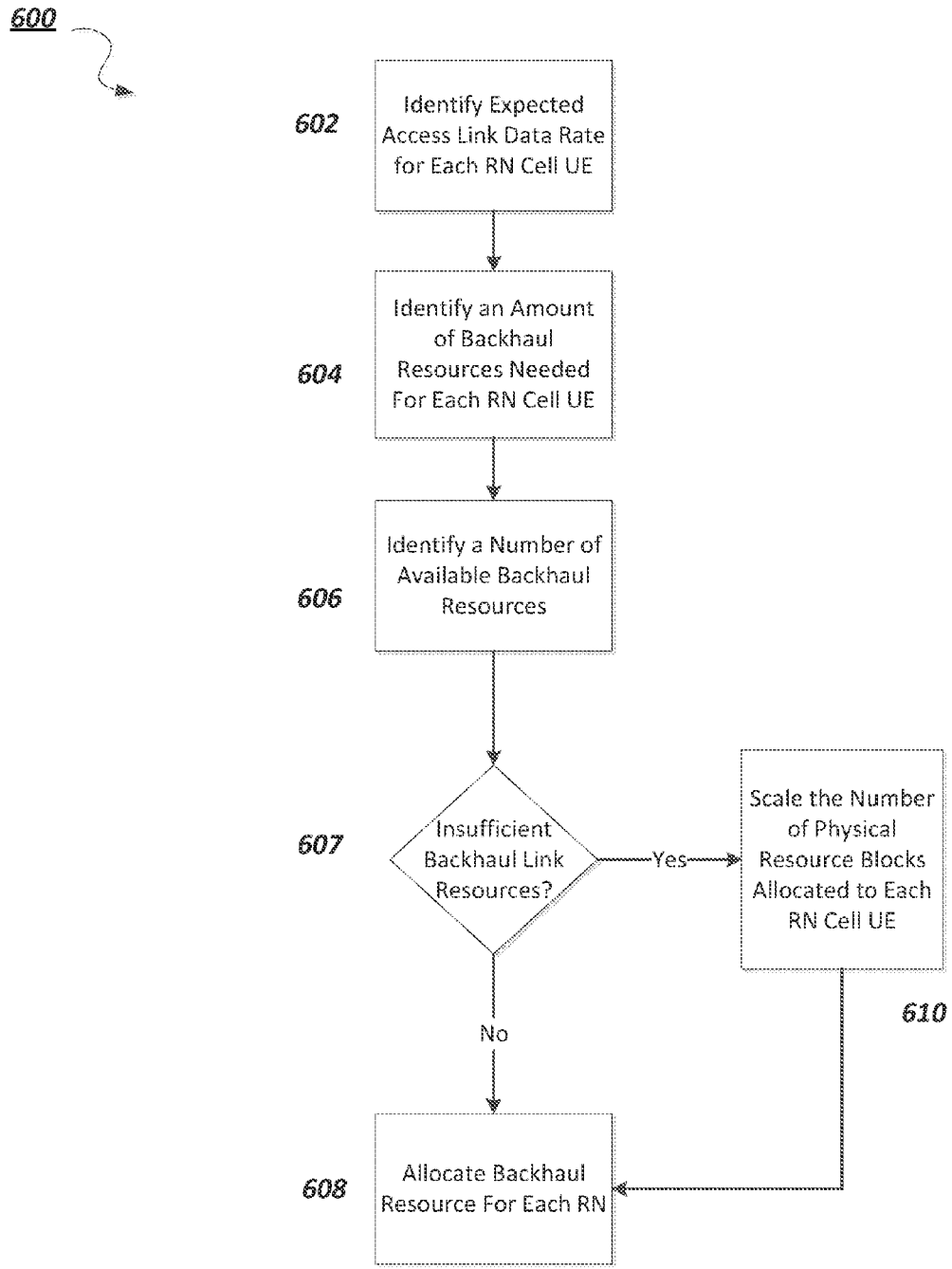
FIG. 6A is a process flow diagram for dynamic allocation of backhaul resources.

FIG. 6A is a process flow diagram 600 for dynamic allocation of backhaul resources. The expected access link data rate for each RN cell user can be identified (602). The RN can feedback the expected access link data rate for the next subframe transmission for each user (or UE) in the cell. To reduce the amount of RN feedback, the RN can report the expected access link data rate for multiple subframes instead, in the case that the access link radio quality is varying slowly.

An amount of backhaul resources needed for each RN cell user can be identified (604) by the DeNB. In some instances, the amount of traffic on the backhaul may be equivalent to the amount of traffic on the access link for all the RNs if the traffic buffer at the DeNB is not empty. At each subframe, the amount of backhaul resources in unit of PRBs needed for the user in RN cell i with user index j is:

$$n_{i,j} = \left\lceil \frac{\min(T_{ij}^a, Q_{ij})}{R_i^b \cdot \tau \cdot B_{prb}} \right\rceil, i = 1, \ldots, N, j = 1, \ldots M_i \quad (9)$$

where $T_{ij}^a$ denotes the predicted transport block size on the access link at the next subframe before the backhaul transmission, $Q_{ij}$ denotes the current traffic buffer size at the DeNB for the user-j in RN cell i, and $B_{prb}$ represents the bandwidth per PRB (e.g. 180 kHz in LTE/LTE-A). The total amount of available backhaul resources can be identified (606). The amount of available backhaul resources can be limited to a value, which may be predetermined or based on other factors. For example, the total amount of available backhaul resources can be limited to be γ PRBs which can be defined based on the number of users in the RN cells and in the donor eNB cell:

$$\gamma = \frac{\sum_{i=1}^{N} M_i \gamma_i}{M_0 \gamma_0 + \sum_{i=1}^{N} M_i \gamma_i} \cdot N_0, \quad (11)$$

where $M_0$, represents the number of UEs associated with donor eNB, $N_0$, represents the total number of PRBs available at the donor eNB, and $\gamma_i$ is the applied weight factor to account for different user priority. For users with higher QoS requirements, higher value of $\gamma_i$ can be assigned. In the special case that all users are of the same priority, $\gamma_i$ can be set to 1.

The allocation may be based on the available backhaul resources (607). If the backhaul link quality is low, there may not be sufficient resources to be allocated since the total amount of resources needed for all RN cell users $\sum_{i=1}^{N} \sum_{j=1}^{M_i} n_{ij}$, from equation (9) is more than the amount of the available resources. In case of insufficient amount of backhaul resources, the number of PRBs allocated to each RN cell user will be scaled (610), for example:

$$\tilde{n}_{ij} = \left\lceil \frac{n_{ij}}{\sum_{i=1}^{N} \sum_{j=1}^{M_i} n_{ij}} \cdot \gamma \right\rceil, i=1, \ldots, N, j=1, \ldots M_i \quad (10)$$

If there are sufficient backhaul link resources, the backhaul resources for each RN can be allocated (608). The backhaul resources allocated to RN cell i in unit of PRBs can be derived as $\sum_{j=1}^{M_i} n_{ij}$ and $\sum_{j=1}^{M_i} \tilde{n}_{ij}$ for the case of sufficient and insufficient amount of backhaul resources, respectively.

The required information to be fed back from the RN to the DeNB is the predicted transport block size on the access link $T_{ij}^a$ for every RN cell UE at each subframe. The dynamic backhaul resource allocation takes advantage of the knowledge of access link data rate and assigns the resource so that same amount of data are transferred from the DeNB to the RN on the backhaul link.

Figure 6B:
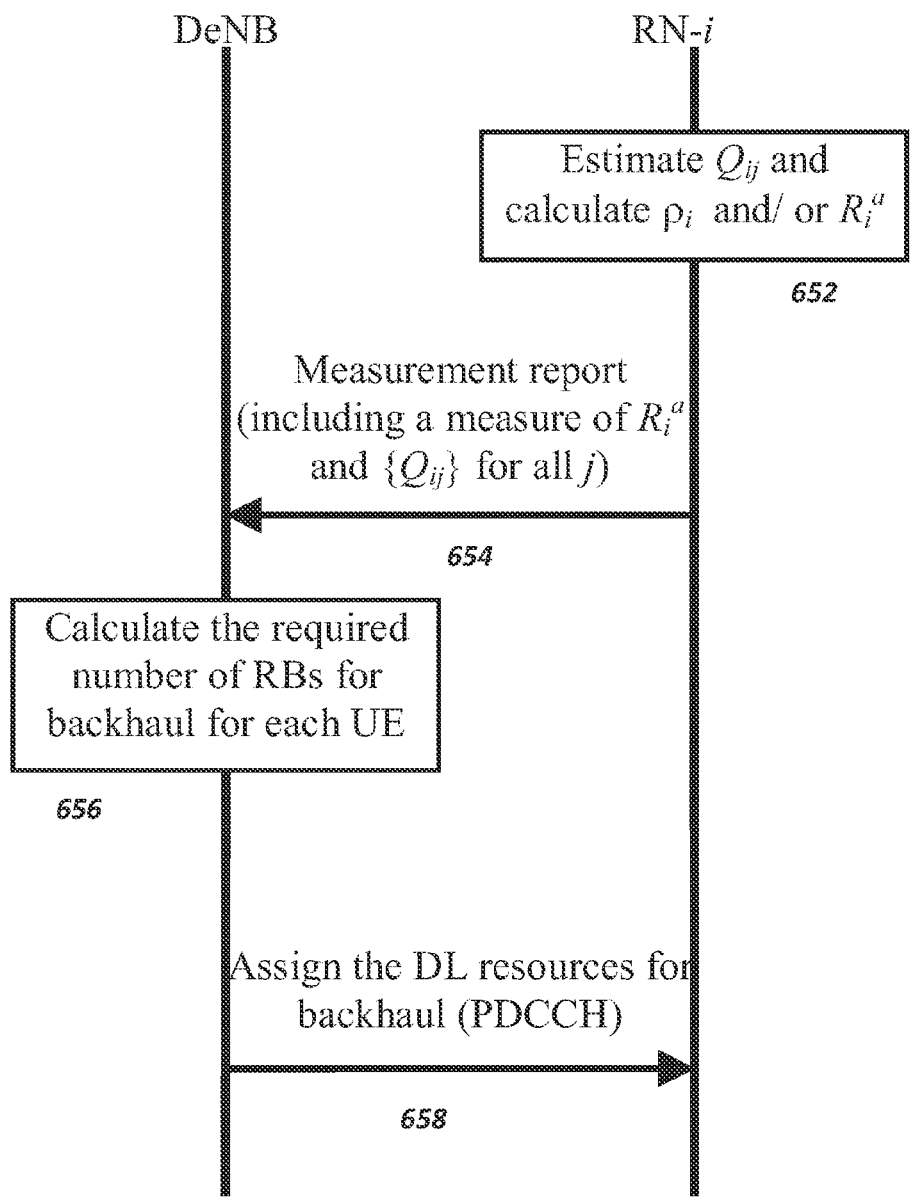
FIG. 6B is a swim-lane diagram for dynamic resource assignment for the backhaul link.

FIG. 6B is a swim-lane diagram 650 for dynamic resource assignment for the backhaul link. A relay node (RNi) can estimate Qij and calculate $\rho_i$ and/or $R_i^a$ (652). A measurement report can be sent to the DeNB (654). The measurement report can be sent from the RNi and can include a measure of Qij and $R_i^a$ for all values of j, the value j being a UE index. The DeNB can calculate the required number of resource blocks (RBs) for backhaul for each UEj (656). The DeNB can assign the downlink (DL) resources for backhaul (PDCCH) (658).

In the static backhaul resource allocation scheme, the signalling overhead is negligible but the performance gain brought by RN may not be satisfactory in certain instances. In the dynamic backhaul resource allocation, the performance can be much improved but the signalling overhead can increase. A semi-static backhaul resource allocation may be considered. In semi-static resource allocation, the RNs may operate in half-duplex mode. When multiple RNs exist in a donor cell, the RNs each could have a different backhaul subframe allocation and may not share the backhaul subframe with other RNs (shown in FIG. 7).

Figure 7:
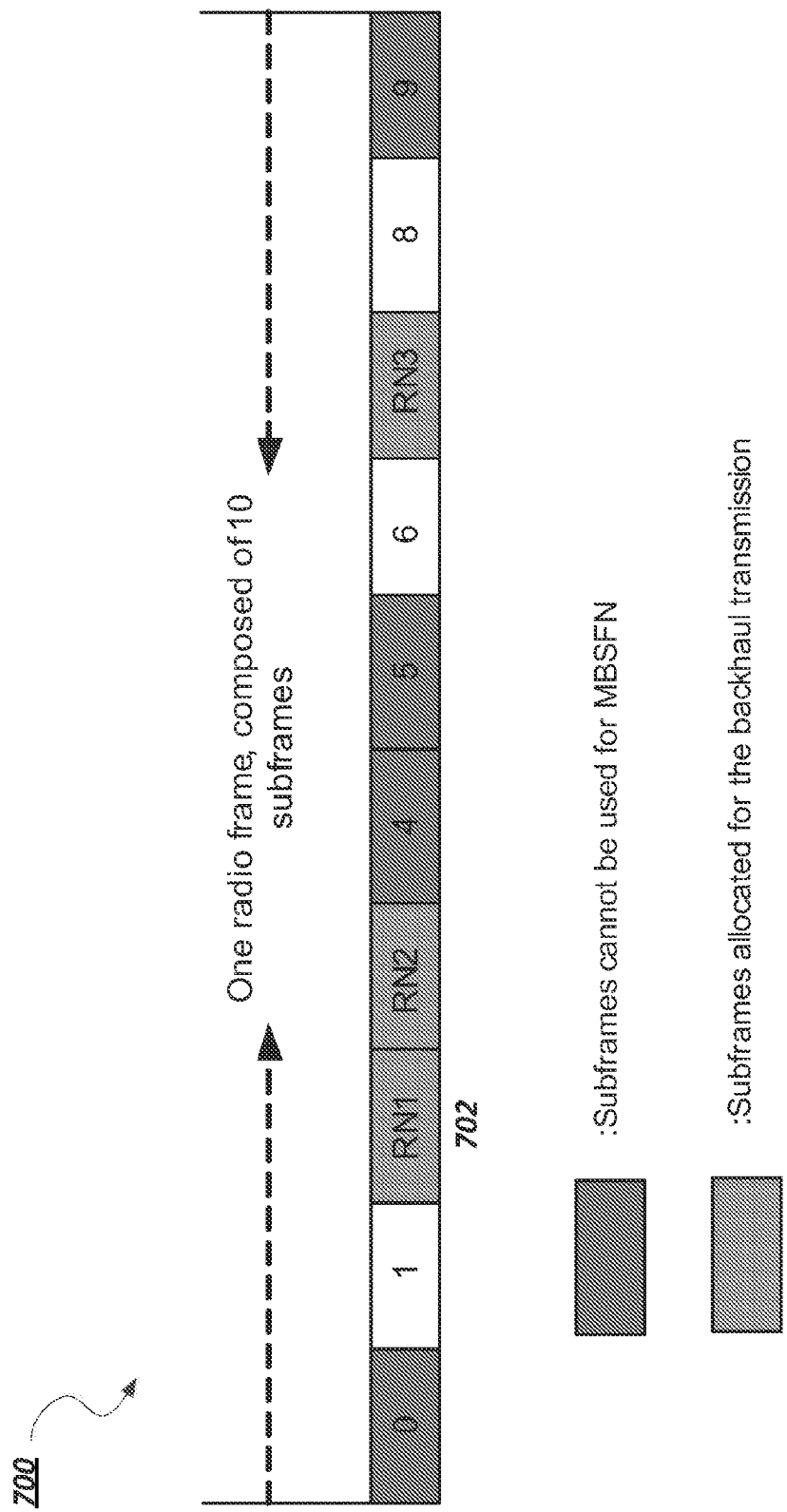
FIG. 7 is a block diagram of an example asynchronous multicast broadcast single frequency network resource allocation for multiple relay nodes.

FIG. 7 is a block diagram of an example asynchronous multicast broadcast single frequency network (MBSFN) resource allocation 700 for multiple relay nodes. The eNB could allocate one entire subframe to one RN and allocate another entire subframe to the other RN. The benefit of this asynchronous RN operation is that the RN can limit the number of subframes it listens to the DeNB and more subframes can be used for access link transmission.

Figure 8:
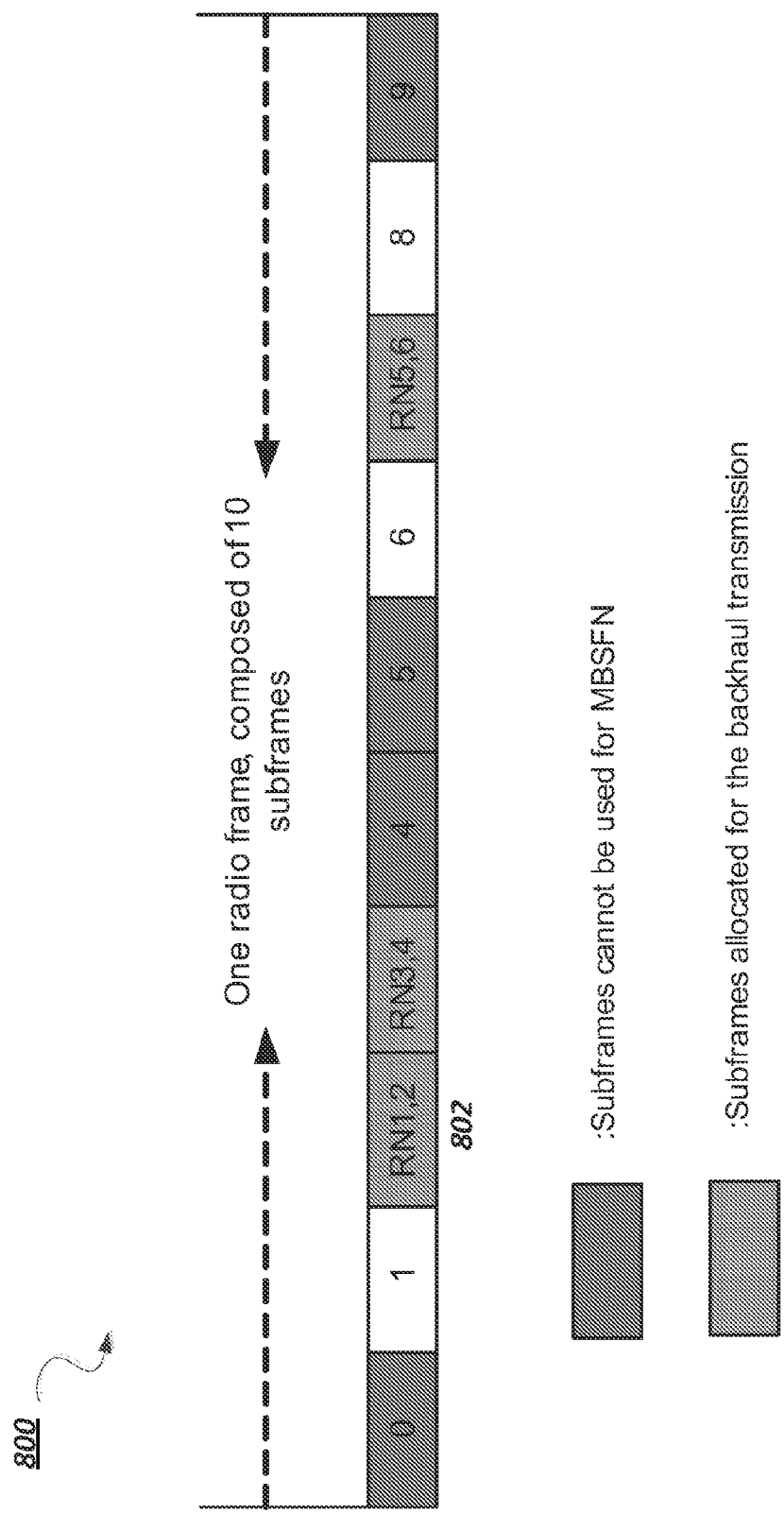
FIG. 8 is a block diagram of an example asynchronous multicast broadcast single frequency network resource allocation for multiple relay nodes sharing the same subframe.

It is also possible to multiplex a set of RNs on one subframe and multiplex another set of RNs on another subframe, as illustrated in FIG. 8. FIG. 8 is a block diagram of an example asynchronous multicast broadcast single frequency network (MBSFN) resource allocation 800 for multiple relay nodes sharing the same subframe. For example, in subframe 2 802, RN1 and RN2 share the same subframe. If RNs are deployed close to each other, the asynchronous RN operation in FIG. 7 may cause relay-to-relay interference. For example, in FIG. 7, during Subframe 2 702, RN1 may be listening to the DeNB on the DL frequency while RN2 may be transmitting to its UEs on the same frequency. As a result RN1 may see interference from RN2 if they are close to each other. In this case, the RN operation in FIG. 8 can be used so that the closed spaced RNs are multiplexed on the same backhaul subframes and the far apart RNs are allocated different backhaul subframes. In some cases, the RNs could be grouped together and then share a common resource to avoid interference. This "relay group" concept could be used widely. For example, when multiple relays are deployed in the same building in order to improve the throughput, these relays could form a "relay group" and may have a group ID. They may share the common downlink backhaul resources or even perform the coordinated DL/UL multi-point transmissions.

Figure 9A:
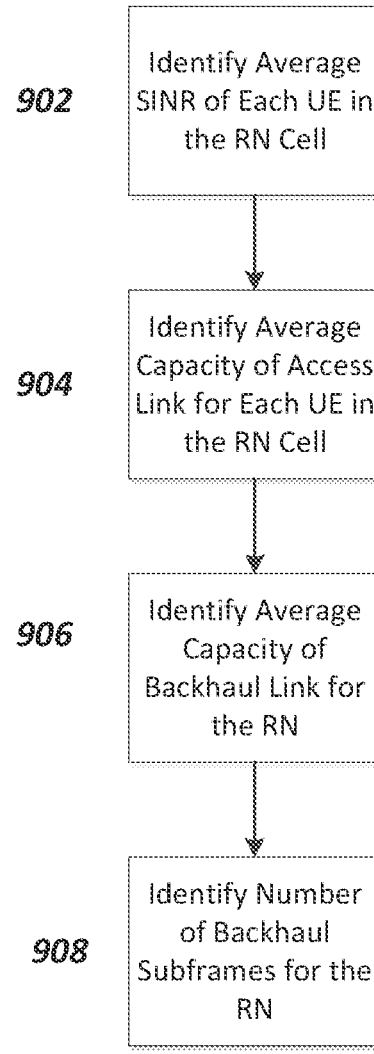
FIG. 9A is a process flow diagram for a semi-static backhaul resource allocation.

FIG. 9A is a process flow diagram 900 for a semi-static backhaul resource allocation. A semi-static subframe allocation may be based, for example, on the average SINR for the access link, which can facilitate a trade-off between the signalling overhead and the performance gain. The geometry or the average SINR of each RN cell UE is reported to the DeNB at the beginning and can be updated semi-statically depending on, for example, the UE mobility and the radio link changes (902). The SINR distribution can be estimated at the RN by the CQI feedback from the UEs or can be derived from the UE measurement reports. The average SINR for the user in RN cell i with user index j can be denoted as $\rho_{ij}$. The average capacity for the access link of each RN cell UE can be identified (904). Applying Shannon theorem, the average capacity for the access link between RN cell i and user j in bits per Hz per second is:

$$R_{ij}^a = \log(1 + \alpha_{ij} \cdot \rho_{ij}), i = 1, \ldots, N, \quad (12)$$

where $\alpha_{ij}$ accounts for possible different power adjustments applied in the RN cell due to the possible power offset of data to the user j compared to the reference signals. The average capacity for the backhaul link in bits per Hz per second can be calculated (906), for example, by equation (1). The number of backhaul subframes for RN cell i can be identified (908). For example, the number of backhaul subframes can be determined based on the aggregated access link data rate such that about the same amount of traffic will be transferred on the backhaul link as on the access link, which gives the follows:

$$R_i^b \cdot n_i \cdot B = \sum_{j=1}^{M_i} \min\left(\frac{R_{ij}^a}{M_i} B_i^a, Q_{ij}\right) \cdot (T_{bh} - n_i), \quad (13)$$

where $Q_{ij}$ is the average buffer size for user j which could be reported by the RN cell i, or can be derived from the user traffic profile, and $T_{bh}$ is the periodicity of the backhaul subframe allocation in units of subframes. For example, in LTE-A Rel-10, $T_{bh}$ can be set as 10 or 40 subframes. $n_i$ in the above equation can be solved as:

$$n_i = \frac{\sum_{j=1}^{M_i} \min\left(\frac{R_{ij}^a}{M_i} B_i^a, Q_{ij}\right) \cdot T_{bh}}{R_i^b \cdot B + \sum_{j=1}^{M_i} \min\left(\frac{R_{ij}^a}{M_i} \cdot B_i^a, Q_{ij}\right)} \quad (14)$$

In the case of full buffer traffic model for the UEs and if the RN has the same bandwidth as the donor eNB (full frequency reuse), equation (14) can be simplified to:

$$n_i = \frac{\sum_{j=1}^{M_i} \frac{R_{ij}^a}{M_i} \cdot T_{bh}}{R_i^b + \sum_{j=1}^{M_i} \frac{R_{ij}^a}{M_i}} \quad (15)$$

The backhaul resource allocated to the RN cell UE on a backhaul subframe is proportional to the UE access link rate which gives the following:

$$B_{ij}^b = \frac{\min\left(\frac{R_{ij}^a}{M_i} B_i^a, Q_{ij}\right)}{\sum_{j=1}^{M_i} \min\left(\frac{R_{ij}^a}{M_i} \cdot B_i^a, Q_{ij}\right)} \cdot B, \quad (16)$$

$$i = 1, \ldots, N, \ j = 1, \ldots M_i$$

In another case, a UE does not have to be assigned backhaul bandwidth within each backhaul subframe. Total $n_i$ backhaul subframe bandwidth are distributed to UEs based on their access rates. Thus the backhaul resource allocated to the RN cell UE on $n_i$ backhaul subframe is proportional to the UE access link rate which gives the following $$B_{ij}^b = \frac{\min\left(\frac{R_{ij}^a}{M_i} \cdot B_i^a, Q_{ij}\right)}{\sum_{j=1}^{M_i} \min\left(\frac{R_{ij}^a}{M_i} \cdot B_i^a, Q_{ij}\right)} \cdot B \cdot n_i, \quad (17)$$

$$i = 1, \ldots, N, \ j = 1, \ldots M_i$$

Similar to what were described above for dynamic allocation, there may be some number of subframes reserved for UEs associated directly with the donor cell or could be constrained from backhaul transmission (e.g. subframe 0, 4, 5, 9 cannot be used for backhaul subframes in Rel 10). Denote the maximum number of subframes can be used for backhaul transmission as $n_{max}$. If $\Sigma_{i=1}^{N} n_i \leq n_{max}$, no additional processing is necessary. Otherwise, if $\Sigma_{i=1}^{N} n_i > n_{max}$, the number of allocated backhaul subframes can be calculated as follows:

$$\tilde{n}_i = \frac{n_i}{\sum_{i=1}^{N} n_i} \cdot n_{max}, \ i = 1, \ldots, N, \quad (18)$$

The backhaul resource allocated to each RN cell UE can be determined using equation (16) or (17) with the revised number of backhaul subframes $\tilde{n}_i$. In equation (18), the number of allocated backhaul subframes $\tilde{n}_i$ can be dedicated for backhaul transmission to the specific RN i as illustrated in FIG. 7.

Hence the number of backhaul subframes and the resource for each RN cell UE at the backhaul subframes are determined. In the semi-static backhaul subframe allocation, the geometry or average SINR of each RN cell UE is fed back from the RN to the DeNB. No additional complexity will be added to the UE for the reason that the RN could estimate the UE geometry or average SINR from CQI or measurement reports. Unlike the static allocation described above, the DeNB can allocate the resources according to the data rate on the access link of each RN cell UE and thus more efficient resource utilization can be achieved. On the other hand, the user geometry or average SINR changes in a slow scale thus only limited amount of feedback overhead would be necessary. Alternatively, instead of the RN signalling the average SINR of each RN cell UE to the DeNB, to further reduce the feedback the RN could signal the aggregated access link data rate to the DeNB, for example, the quantity $$\sum_{j=1}^{M_i} \min\left(\frac{R_{ij}^a}{M_i} \cdot B_i^a, Q_{ij}\right)$$

in equation (14) or $$\sum_{j=1}^{M_i} \frac{R_{ij}^a}{M_i}$$

in equation (15).

Figure 9B:
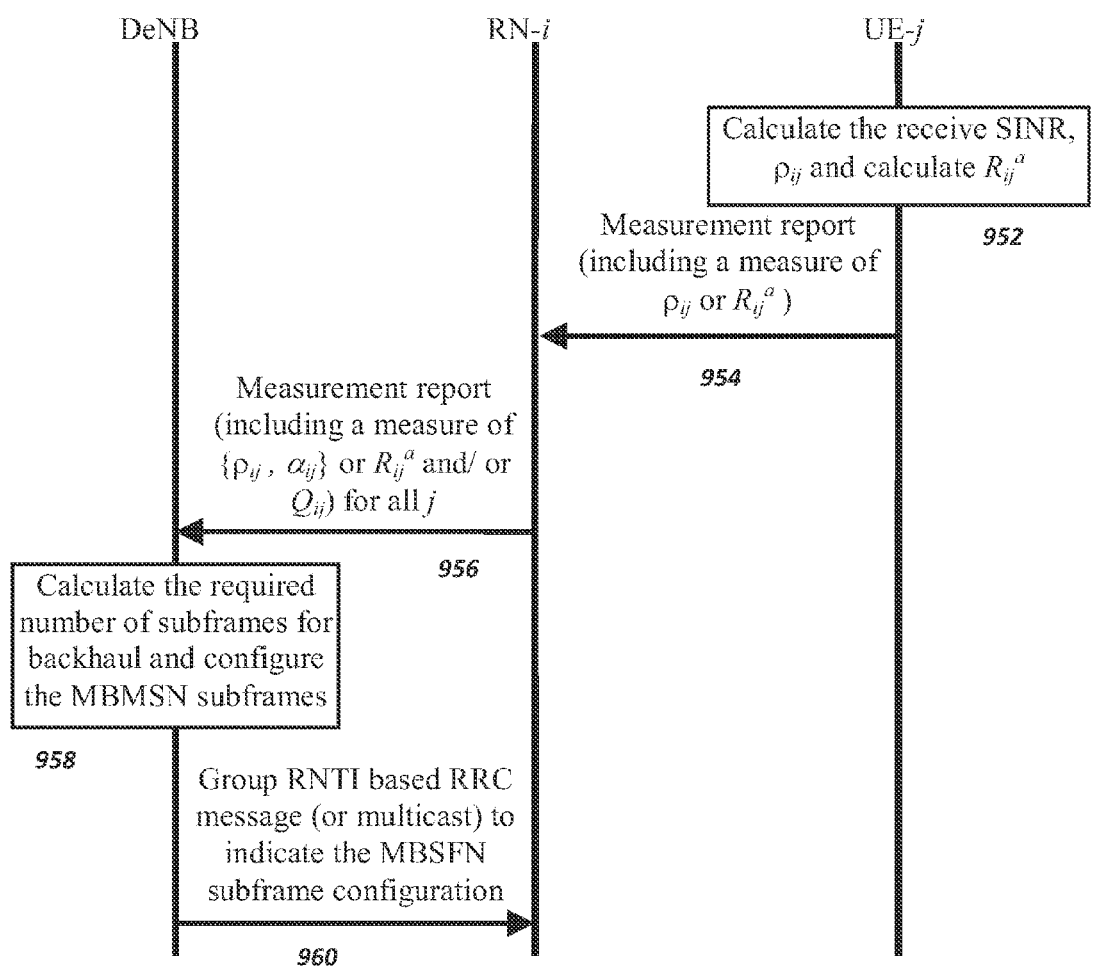
FIG. 9B is a swim-lane diagram 950 for a semi-static backhaul resource allocation.

FIG. 9B is a swim-lane diagram 950 for a semi-static backhaul resource allocation. A UE (or a plurality of UEs, designated with an index j: $UE_j$) can calculated a SIRN, $\rho_{ij}$ and calculate $R_{ij}^a$ (952). A measurement report can be sent to a relay node ($RN_i$) (954). The measurement report can include a measure of $\rho_{ij}$ and/or $R_{ij}^a$. The relay node RN, can send a measurement report to the DeNB (956). The measurement report sent to the DeNB can include a measure of $\alpha_{ij} \cdot \rho_{ij}$ or $R_{ij}^a$ and/or $Q_{ij}$ for all values of j. The DeNB can calculate the required number of subframes for backhaul and configure the MBSFN subframes (958). The group RNTI-based RRC message can be sent to the DeNB to indicate the MBSFN subframe configuration (960). The message may also be a multicast, in some instances.

The present disclosure describes backhaul resource allocation in type I relay networks. static, dynamic, and semi-static resource allocation schemes are described. Depending on the overhead constraints, any scheme can be chosen to accommodate the type I relay network design requirements. The semi-static resource allocation solution, however, may provide a desired tradeoff between performance and signaling overhead. In summary, with the addition of RN in the macro network, the user throughput can be increased significantly with smart backhaul resource allocation scheme.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Other implementations fall within the scope of the following claims.

What is claimed is:

1. A method for operating a wireless communications system that includes a relay node and a base station, the method comprising:

identifying, by the base station, a backhaul link data rate for a backhaul link between the relay node and the base station;

identifying an access link data rate for an access link between the relay node and a user equipment (UE); and adjusting the allocation of available resources between the backhaul link and the access link, wherein the allocation of available resources between the backhaul link and the access link is optimized by assigning $n_i$ subframes every $T_{bh}$ subframes to the backhaul link between the base station and RN-i such that the aggregate data transmitted in $n_i$ subframes over the backhaul link and the aggregate data transmitted in ($T_{bh}-n_i$) subframes over the access link associated with RN-i are equal.

2. The method of claim 1, wherein the backhaul data link rate between the base station and the relay node is identified based, at least in part, by a measured average signal to interference plus noise ratio (SINR) over the specific link.

3. The method of claim 1, wherein the access link data rate is identified based, at least in part, on an average signal to interference plus noise ratio (SINR) observed over the access link.

4. The method of claim 3, wherein the average SINR observed over the access link is scaled by a power control parameter.

5. The method of claim 1, wherein the access link data rate is identified based, at least in part, on an average signal to interference plus noise ratio (SINR) observed over the access link between the relay node and the UE.

6. The method of claim 5, wherein the average SINR observed over the access link between the relay node and the UE is scaled by a power control parameter.

7. A network element operating in a wireless communications network, the network element comprising:

a hardware processor; and a transceiver;

the hardware processor and the transceiver configured to:

identify a backhaul link data rate for a backhaul link between a relay node and a base station;

identify an access link data rate for an access link between the relay node and a user equipment (UE); and adjust the allocation of available resources between the backhaul link and the access link, wherein the allocation of available resources between the backhaul link and the access link is optimized by assigning $n_i$ subframes every $T_{bh}$ subframes to the backhaul link between the base station and RN-i such that the aggregate data transmitted in $n_i$ subframes over the backhaul link and the aggregate data transmitted in ($T_{bh}-n_i$) subframes over the access link associated with RN-i are equal.

8. The network element of claim 7, wherein the backhaul link data rate between the base station and the relay node is identified based, at least in part, by a measured average signal to interference plus noise ratio (SINR) over the specific link.

9. The network element of claim 7 wherein the access link data rate is identified based, at least in part, on an average signal to interference plus noise ratio (SINR) observed over the access link.

10. The network element of claim 9, wherein the average SINR observed over the access link is scaled by a power control parameter.

11. The network element of claim 7, wherein the access link data rate is identified based, at least in part, on an average signal to interference plus noise ratio (SINR) observed over the access link between the relay node and the UE.

12. The network element of claim 11, wherein the average SINR observed over the access link between the relay node and the UE is scaled by a power control parameter.

13. The network element of claim 7, further comprising receiving information about the UE from the relay node.

14. The network element of claim 7, further comprising predicting a demand for resources for the UE.

15. The network element of claim 7, further comprising identifying a signal to interference and noise ratio between the relay node and the base station, and wherein identifying the backhaul link data rate is based, at least in part, on the signal to interference and noise ratio.

16. The network element of claim 7, wherein the backhaul link data rate is identified based, at least in part, on the average signal to interference plus noise ratio of every UE connected to the relay node.

17. The network element of claim 7, wherein the backhaul link data rate is identified based, at least in part, on an aggregated access link data rate of the relay node.

* * * * *